Patented Dec. 10, 1946

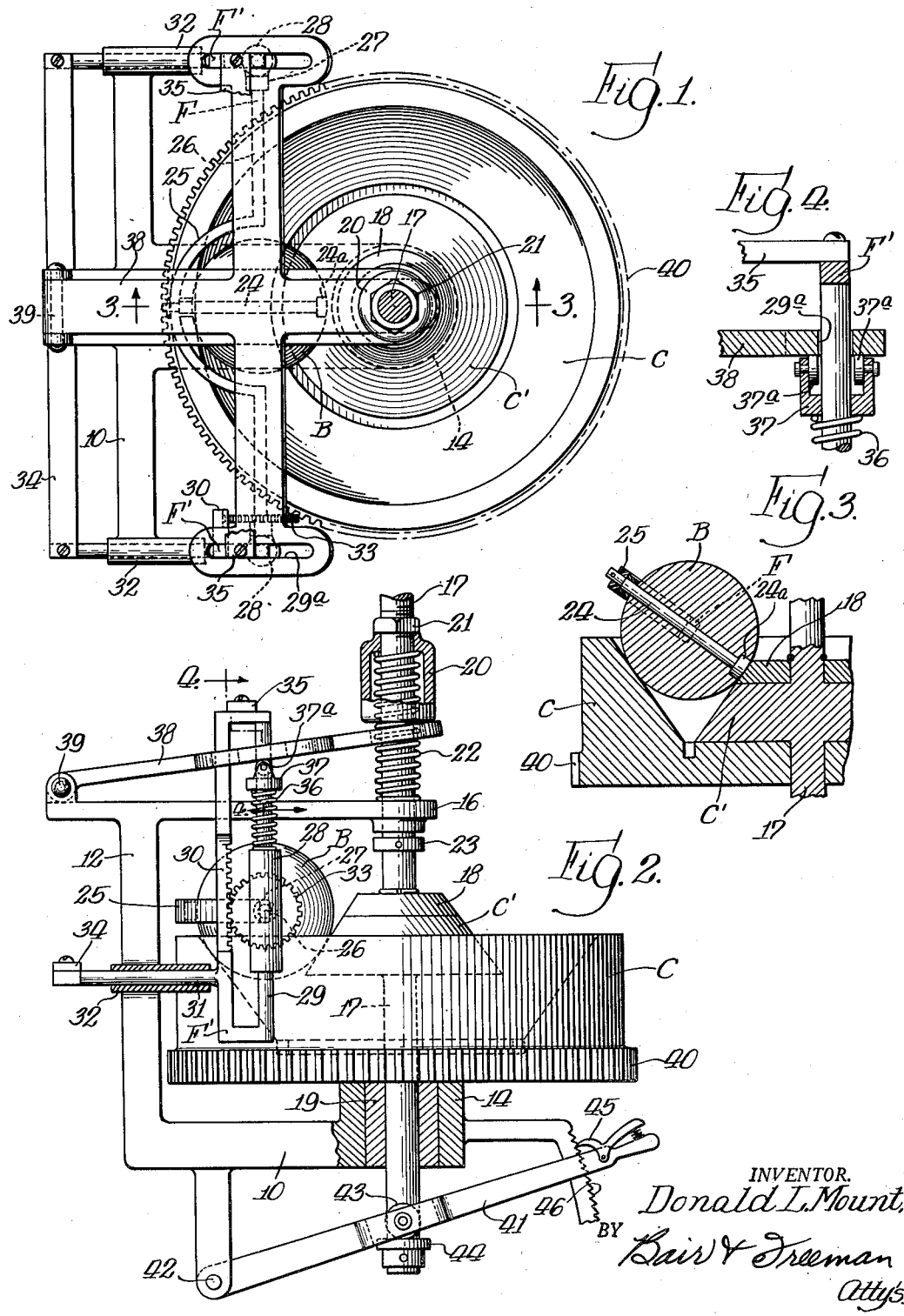

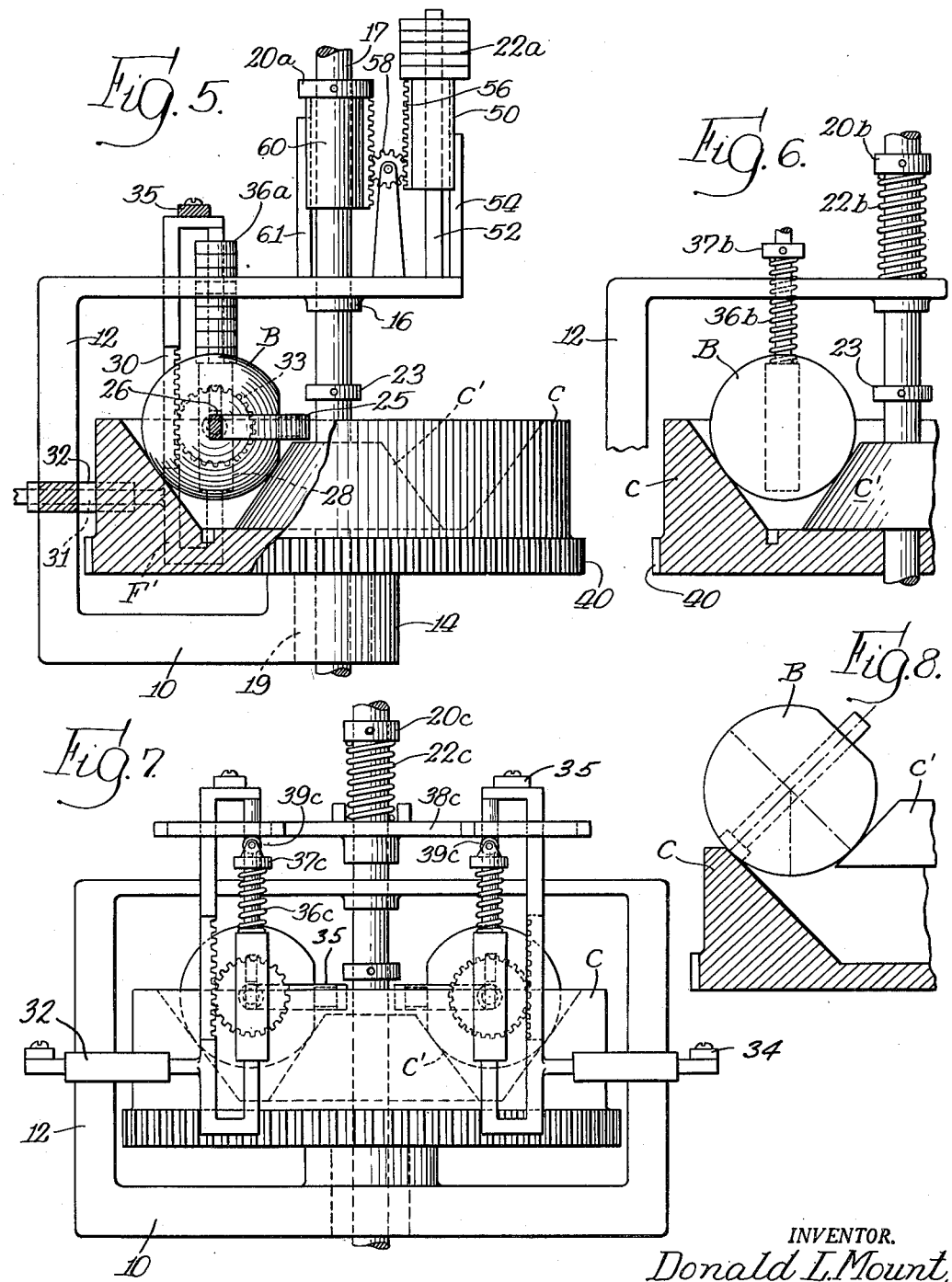

2,412,351

UNITED STATES PATENT OFFICE 2,412,351

VARIABLE-SPEED TRANSMITTER

Donald L. Mount, Memphis, Mo.

Application July 14, 1944, Serial No. 544,895

17 Claims. (Cl. 74—193)

My present invention relates to a power transmission wherein the speed between the driven element and the driving element may be varied in infinitely small steps between the limits of speed change.

One object of the invention is to provide a variable speed transmitter wherein there is a relatively simple arrangement for automatically shifting a ball that frictionally engages a pair of cone surfaces so that the ball and the cone surfaces have continuously varying diameter relationship to each other as the cones are relatively shifted, the output speed being thereby varied to any desired proportion within the range of the transmitter.

Another object is to provide a construction of this character wherein the cone elements may be mounted on a common axis and the ball element is engaged frictionally with the surfaces of the cones and caused to roll radially inward on both cones during the adjustment whereby friction occurring during the adjustment period is minimized and a driving connection is maintained at all times during the adjustment.

Another object is to provide an arrangement of one cone within the other, and their cone surfaces being external and internal respectively, so as to present a V-shaped groove in which a ball rests under spring pressure and the ball is carried by a framework having a compound motion that actuates a pinion and rack mechanism to rotate the ball to different adjusted positions in relation to both cones as they are relatively adjusted.

With these and other objects in view, my invention consists in the construction, arrangement and combination of the various parts of my device, whereby the objects contemplated are attained, as hereinafter more fully set forth, pointed out in my claims, and illustrated in the accompanying drawings, wherein:

Figure 1 is a plan view of a variable speed transmitter embodying my invention;

Figure 2 is a side elevation thereof;

Figure 3 is a sectional view on the line 3—3 of Figure 1 showing the parts of the transmitter adjusted to a different position;

Figure 4 is a sectional view on the line 4—4 of Figure 2;

Figure 5 is a side elevation, partly in section showing a modified construction wherein weights are used instead of springs as in Figure 2;

Figure 6 is a similar view showing a different spring arrangement than Figure 2; and Figure 7 is another modified construction showing two balls instead of one in my transmission.

On the accompanying drawings, I have used the reference numeral 10 to indicate a main frame, which frame has an upper extension 12 and hubs 14 and 16 aligned with each other. In the hub 14, a cone element C is journaled and within the cone element C is a second cone element C'. The cone element C' is part of or mounted on a driven shaft 17 and has a freely rotatable ring portion 18. The shaft 17 is journaled in the hub 16 and in a hub 19 of the cone element C and is slidable relative thereto. A sleeve 20 is threaded on the shaft 17 and is located relative thereto in various adjusted positions by a lock nut 21. A spring 22 extends between the upper end of the sleeve 20 and the hub 16 for normally raising the shaft 17 and a stop collar 23 limits the upward movement.

The cone element C, it will be noted, has an interior cone surface whereas the cone element C' has an exterior cone surface. A ball B is adapted for frictional engagement with these surfaces, and the ball is rotatable on a shaft 24. The shaft 24 is carried by a frame F, having a yoke portion 25 and arm portions 26 extending therefrom, as best shown in Figure 1. The outer ends of the arms 26 are rotatable in hubs 27 of vertical sleeves 28, which sleeves are vertically slidable on rod portions 29 of a sub-frame F'.

The sub-frame F' has a rack 30 parallel to the rod 29, and has a horizontal rod-like portion 31 slidable in a bearing 32 of the main frame 10. Two of the bearings 32 and two of the sub-frames F' are provided. Only one rack 30 need be provided, however, and a pinion 33 is in mesh therewith. The pinion 33 is mounted on one of the arms 26 of the yoke frame F so that vertical sliding movement of the sleeves 28 will result in rotation of the yoke frame F, and consequently rotation of the shaft 24 on that axis of the ball B which is horizontal and at right angles to the longitudinal axis of the shaft itself.

The two sub-frames F' may be connected together to facilitate their simultaneous movement by rigid links 34 and 35. On the rod 29 of each sub-frame F' is a spring 36. It is interposed between the upper end of the sleeve 28 and a collar 37. A lever 38 pivoted at 39 to the frame extension 12 is adapted to bear against rollers 39 on the collar and in turn to be engaged with the sleeve 20 whereby downward movement of the sleeve will result in an increase in pressure of the springs 36 and consequently of the ball B against the cone surfaces as will hereinafter appear.

In Figure 5, I show a modified construction wherein weights 36a take the place of the spring 36 in Figure 2 and weights 22a take the place of the spring 22. The weights 36a are imposed directly on the bosses 28 without any connection such as the lever 38 in Figure 2 with the weights 22a. The weights 22a in turn are carried by a vertical sleeve 50 slidably mounted on a post 52 of the frame member 12 and keyed against turning by a key 54. The sleeve 50 has rack teeth 56, which through a pinion 58 impart movement to a rack sleeve 60 mounted under the collar 20a of the shaft 17. The weights 22a accordingly tend to raise the shaft 17 and the cone C' in substantially the same manner that the spring 22 does so in Figure 2.

In Figure 6 I show springs 22b and 36b in place of the springs 22 and 36 of Figure 2, the two springs in this instance being independent instead of inter-connected by the lever 38 of Figure 2.

Figure 7 shows still another spring arrangement wherein a cross head 38c is interposed between the springs 22c and 36c and a double ball arrangement is shown, so as to provide twice the traction and balance the driving tension in a more efficient manner.

Practical operation

In the operation of my variable speed transmitter, assuming the parts to be in the position of Figure 2, it will be noted that the shaft 24 of the ball B is substantially horizontal and accordingly the surfaces of the cones C and C' are engaging the ball at diameter lines on the ball substantially equal to each other. The diameter line of engagement on the cone C' is less than the diameter line of engagement on the cone C, and therefore the cone C will rotate in the same direction but at less speed than the cone C'. Thus power from any suitable source, may be applied to the shaft 17 and a reduced speed taken off the cone C, as by meshing of a gear with gear teeth 40 thereon. The teeth 40 are shown merely by way of illustration, whereas the power take-off may be provided in any other suitable manner.

If now the speed is to be further decreased, the shaft 17 may be shifted downwardly. This may be accomplished, for instance, by means of an adjusting lever 41 pivoted at 42 to the frame 10 and carrying a pair of rollers 43 engaging a collar 44 of the shaft 17. The spring 22 tends to keep the shaft 17 raised but the lever may be used for lowering it and may be locked in any desired position by means of a detent 45, coacting with serrations 46 of a stationary part of the main frame 10.

As the shaft 17 is moved downwardly, the cone C' likewise moves downwardly. The springs 36 cause the ball B to follow the receding cone C', thereby decreasing the diameter lines of engagement on both the ball and cone C', and increasing the diameter line on the ball where it engages the cone C. The diameter line on the cone C decreases and, as an ultimate result of all these changes in diameters, the cone C rotates at a progressively increased speed as the lever 41 is adjusted downwardly and as a constant speed input is applied to the shaft 17.

The change in diameter on the ball B occurs due to the yoke frame F rotating clockwise in Figure 2 as the cone C' is lowered. Such rotation occurs as a result of the way the frame F is carried by the sub-frames F', the sub-frames themselves moving toward the right and the frame F moving downwardly relatively to the sub-frames or downwardly and toward the right with relation to the main frame. The downward movement of the frame F relative to the sub-frame F' causes the pinion 33 to roll down the rack 30, thus imparting the desired clockwise rotation to the yoke frame F, so that the ball B engages the cone surfaces at progressively different diameters of the ball.

In the final or lowest position of the lever 41, the shaft 24 has tipped to such a position that the head of the shaft indicated at 24a is in contact with the freely rotatable ring 18 and the ring can accordingly remain stationary while the cone C' rotates, the head 24a constituting a "dead spot" for engagement with the element 18 at this time. During the relative adjustment of the cones C and C', the ball B merely rolls along the cone surfaces, downwardly along one as it moves upwardly along the other, and this rolling action eliminates any sliding or other friction during the adjustment for changing speeds.

My device is applicable for many installations where a change in speed from a drive shaft to a driven shaft is desired and where the power transmitted is not very great. The device is preferably made with ball or roller bearings throughout instead of plain bearings as illustrated, but of course that is immaterial so far as the patentable features of my invention are concerned. The use of ball or roller bearings is particularly desirable when the device is used in connection with a meter for the purpose of adjusting the indicating means of the meter in relation to the flow of the fluid through the meter as friction must be held to a minimum.

With respect to the lever 38, it effects an increase of the pressure of the springs 36 on the sleeves 28 and thereby an increase in frictional engagement between the ball B and the cones C and C' as the cone C' is adjusted downwardly. Since the sleeve 20 moves downwardly faster than the ball B and consequently faster than the sleeves 28, the collars 37 are likewise moved downwardly faster than the sub-frames F', thereby effecting the desired increase in spring pressure.

The operation of Figure 5 is a little different than Figure 2 in that the yoke frame F is mounted on the other side of the ball. In the position shown in Figure 5, the speed ratio is about one to one. As the cone C' is raised, the yoke frame will rotate counter-clockwise, and the ball will tilt with it and at the same time move outwardly from the axis of rotation as well as be raised by the inner cone. Finally the dead end of the ball will contact the outer cone and the ball will rotate freely under the driving force through friction on the cone C', but no motion will be transmitted to the outer cone.

The weight arrangement shown in Figure 5 operates in substantially the same manner as the spring arrangement in Figure 2, except that the pressure does not vary in different positions of adjustment as where springs are used.

With the spring arrangement in Figure 6, the difference in position of the shaft 17 does not change the collar 37b as in Figure 2.

Figure 7 again is somewhat like Figure 2 but without a change in leverage between the collar 37c and the collar 20c. Instead the spring 22c is opposed by the two springs 36c and all three springs accordingly cooperate to bias the shaft 17 in an upward direction. Figure 7 shows a better arrangement from an efficiency standpoint by having two balls for balancing the pressures instead of one as in the previous figures.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a variable speed transmitter, a pair of cone elements mounted for rotation on a common axis and being arranged one within the other, means for driving one of said cone elements and utilizing the other as a driving means, and means for varying the relative speeds of said cone elements, comprising a rotatable ball element engaging with both of said cone elements to transmit rotation from one to the other, said ball element being pivoted for oscillation on a line at right angles to its axis of rotation to shift the secant line of engagement between the ball element and the cone elements, simultaneously increasing one and decreasing the other, said cone elements being axially adjustable relative to each other, and means biasing said ball element to engage said cone elements.

2. In a speed transmitter of the character disclosed, a pair of cone elements mounted for rotation and for axial adjustment in relation to each other, means for driving one of said cone elements and utilizing the other as a driving means, and means for varying the relative speed of said cone elements, comprising means for effecting axial adjustment thereof and a rotatable ball element engaging both of them to transmit rotation from one to the other, means biasing said ball element to engage said cone elements, and means for effecting a following of said ball element relative to said cone elements during adjustment of said cone elements relative to each other.

3. In a variable speed transmission device, a pair of cone elements mounted for rotation on a common axis and arranged one within the other, means for driving one of said cone elements and utilizing the other as a driving means, and means for varying the relative speeds of said cone elements, comprising a rotatable ball element engaged with both, a frame for said ball element pivoted for oscillation on an axis at right angles to the axis of rotation of said ball element to shift the secant line of engagement between the ball element and the cone elements, simultaneously increasing one and decreasing the other, said cone elements being axially adjustable relative to each other, and means biasing said ball element to resiliently engage said cone elements and follow them during such axial adjustment.

4. In a variable speed transmission device, a pair of cone elements mounted for rotation on a common axis and arranged one within the other, means for driving one of said cone elements and utilizing the other as a driving means, and means for varying the relative speeds of said cone elements, comprising a rotatable ball element engaged with both, a frame for said ball element pivoted for oscillation on an axis at right angles to the axis of rotation of said ball element to shift the secant line of engagement between the ball element and the cone elements, simultaneously increasing one and decreasing the other, said cone elements being axially adjustable relative to each other, rack and pinion means for rotating said ball element about its axis of oscillation as said cone elements are relatively adjusted, and means for increasing the pressure of said ball element against said cone elements in one direction of axial movement of the cone elements relative to each other.

5. In a variable speed transmission device, a pair of cone elements mounted for rotation on a common axis and arranged one within the other, means for driving one of said cone elements and utilizing the other as a driving means, and means for varying the relative speeds of said cone elements, comprising a rotatable ball element engaged with both, a frame for said ball element pivoted for oscillation on an axis at right angles to the axis of rotation of said ball element to shift the secant line of engagement between the ball element and the cone elements, simultaneously increasing one and decreasing the other, said cone elements being axially adjustable relative to each other, and rack and pinion means for rotating said ball element about its axis of oscillation as said cone elements are relatively adjusted.

6. In a variable speed transmitter, a pair of cone elements mounted for rotation on a common axis and arranged one within the other and for relative axial adjustment, and means for varying the relative speed of said cone elements, comprising means for axially adjusting them and a rotatable ball element engaging both to transmit rotation from one to the other, said ball element being pivoted for oscillation to shift the secant line of engagement between the ball element and the cone elements simultaneously as said cone elements are axially adjusted relative to each other.

7. A variable speed transmitter comprising a pair of cone elements, one having an internal surface and the other an external surface, and the latter being mounted inside the former, one of said cone elements being driven and the other constituting a driving means, a ball element engaging the cone surfaces of both of said cone elements, means for mounting said ball element comprising a shaft on which it is rotatable, a yoke frame carrying said shaft for oscillation on an axis normal to the axis of rotation of said ball element, means biasing said yoke frame to move in a direction for frictionally engaging said ball with said cone surfaces, means geared to said yoke frame to cause it to rotate as the ball element is shifted relative to the cone surfaces, and means for shifting said ball element relative to said cone surfaces comprising mechanism to move one cone element axially relative to the other cone element and including a sub-frame relative to which said yoke frame is slidable, a main frame supporting said cone elements, said sub-frame being slidable relative thereto at right angles to the sliding of the yoke frame relative to said sub-frame, a rack carried by said sub-frame and a pinion on said yoke frame engageable therewith for rotating the yoke frame in accordance with the adjustment of said cone elements, one of said cone elements and said ball having, respectively, a freely rotating ring and a dead-spot comprising the end of said shaft for coaction with each other at one limit of adjusting movement of the cone elements relative to each other.

8. A variable speed transmitter comprising a pair of cone elements, one having an internal surface and the other an external surface, and the latter being mounted inside the former and the two being axially adjustable in relation to each other, a ball element engaging the cone surfaces of both of said cone elements, means for mounting said ball element comprising a shaft on which it is rotatable, a yoke frame carrying said shaft for oscillation on an axis normal to the axis of rotation of said ball element, means biasing said yoke frame to move in a direction for frictionally engaging said ball with said cone surfaces, means geared to said yoke frame to cause it to rotate as the ball element is shifted relative to the cone surfaces, and means for shifting said ball element relative to said cone surfaces, in accordance with the axial adjustment of said cone elements, one of said cone elements and said ball having, respectively, a freely rotating ring and a dead-spot for coaction with each other at one limit of axial adjusting movement of the cone elements relative to each other.

9. A variable speed transmitter comprising a pair of cone elements, one having an internal surface and the other an external surface, and the latter being mounted inside the former, a ball element engaging the cone surfaces of both of said cone elements, means for mounting said ball element comprising a shaft on which it is rotatable, a yoke frame carrying said shaft for oscillation on an axis normal to the axis of rotation of said ball element, means biasing said yoke frame to move in a direction for frictionally engaging said ball with said cone surfaces, means geared to said yoke frame to cause it to rotate as the ball element is shifted relative to the cone surfaces, and means for shifting said ball element relative to said cone surfaces comprising mechanism to move one cone element axially relative to the other cone element, one of said cone elements and said ball having, respectively, a freely rotating ring and a dead-spot comprising the end of said shaft for coaction with each other.

10. A variable speed transmitter comprising a pair of cone elements, one of said cone elements being driven and the other constituting a driving means, a ball element engaging the surfaces of both cone elements, means for mounting said ball elements comprising a shaft on which it is rotatable, a frame carrying said shaft for oscillation on an axis normal to the axis of rotation of said ball element, means geared to said frame to cause it to rotate for shifting said ball element relative to the cone surfaces, mechanism to move one cone element axially relative to the other cone element, and an inter-connection between said last means and said geared means for rotating said frame in accordance with the adjustment of said cone elements.

11. A variable speed transmitter comprising a pair of cone elements mounted on a common axis, one having an internal cone surface and the other an external cone surface, and the latter being mounted within the former, one of said cone elements being driven and the other constituting a driving means, a ball element resiliently engaging both of said cone surfaces, means for mounting said ball element comprising a shaft on which it is rotatable, a frame carrying said shaft for oscillation on an axis normal to the axis of said shaft, said frame being oscillatable to shift said ball element in its diametrical engagement with said cone surfaces comprising mechanism to move one cone element axially relative to the other cone element and including means to oscillate said frame in accordance with the adjustment of said cone elements, one of said cone elements and said ball having, respectively, a freely rotating ring and a dead-spot for coaction with each other at one limit of adjusting movement of the cone elements relative to each other.

12. A variable speed transmitter comprising a pair of cone elements mounted on a common axis, one having an internal cone surface and the other an external cone surface, and the latter being mounted within the former, one of said cone elements being driven and the other constituting a driving means, a ball element resiliently engaging both of said cone surfaces, means for mounting said ball element comprising a shaft on which it is rotatable, a frame carrying said shaft for oscillation on an axis normal to the axis of said shaft, said frame being oscillatable to shift said ball element in its diametrical engagement with said cone surfaces comprising mechanism to move one cone element axially relative to the other cone element and including means to oscillate said frame in accordance with the adjustment of said cone elements.

13. In a speed transmitter of the character disclosed, a pair of cone elements mounted for rotation and for relative axial adjustment, means for driving one of said cone elements and utilizing the other as a driving means, and means for varying the relative speed of said cone elements, comprising means for axially adjusting them and a rotatable ball element engaging both of them to transmit rotation from one to the other, weights biasing said ball element to engage said cone elements, and means for effecting a follow-up of said ball element with respect to said cone elements during adjustment of said cone elements relative to each other.

14. In a variable speed transmission device, a pair of cone elements mounted for rotation on a common axis and arranged one within the other, means for driving one of said cone elements and utilizing the other as a driving means, and means for varying the relative speeds of said cone elements, comprising a rotatable ball element engaging with both cone elements, a frame for said ball element pivoted for oscillation on an axis at right angles to the axis of rotation of said ball element to shift the secant line of engagement between the ball element and the cone elements, simultaneously increasing one and decreasing the other, said cone elements being axially adjustable relative to each other, rack and pinion means for rotating said ball element about its axis of oscillation as said cone elements are relatively adjusted, and weight operated means for biasing said ball elements towards said cone elements and one of said cone elements away from the other one.

15. In a speed transmitter of the character disclosed, a pair of cone elements mounted for rotation and for relative axial adjustment, means for driving one of said cone elements and utilizing the other as a driving means, and means for varying the relative speed of said cone elements, comprising means for effecting such axial adjustment and a pair of rotatable ball elements located diametrically opposite each other and engaging both cone elements to transmit rotation from one to the other, means biasing said ball elements to engage said cone elements, and means for effecting a following of said ball elements in relation to said cone elements during relative adjustment of the cone elements.

16. In a variable speed transmission device, a pair of cone elements mounted for rotation on a common axis and arranged one within the other, means for driving one of said cone elements and utilizing the other as a driving means, and means for varying the relative speeds of said cone elements, comprising a pair of rotatable ball elements engaged with both cone elements and located diametrically opposite each other, a frame for each of said ball elements and each pivoted for oscillation on an axis at right angles to the axes of rotation of said ball elements to shift the secant line of engagement between the ball elements and the cone elements, simultaneously increasing one and decreasing the other, said cone elements being axially adjustable relative to each other, and means for rotating said ball elements about their axes of oscillation in accordance with the relative adjustment of said cone elements.

17. In a variable speed transmitter, a pair of cone elements mounted for rotation on a common axis and arranged one within the other for relative axial adjustment, means for varying the relative speed of said cone elements, comprising means for changing such axial adjustment and a rotatable ball element engaging both to transmit rotation from one to the other, said ball element being pivoted for oscillation to shift the secant line of engagement between the ball element and the cone elements simultaneously as the cone elements are axially adjusted relative to each other, and spring means biasing said cone elements relatively away from each other and said ball element relatively toward said cone elements, said spring means being mounted in series relation to each other.

DONALD L. MOUNT.